United States Patent [19]

Schmidt et al.

[11] Patent Number: 5,174,811
[45] Date of Patent: Dec. 29, 1992

[54] METHOD FOR TREATING RARE EARTH-TRANSITION METAL SCRAP

[75] Inventors: Frederick A. Schmidt; David T. Peterson, both of Ames; John T. Wheelock, Nevada; Lawrence L. Jones, Des Moines, all of Iowa

[73] Assignee: Iowa State University Research Foundation, Inc., Ames, Iowa

[21] Appl. No.: 591,040

[22] Filed: Oct. 1, 1990

[51] Int. Cl.⁵ ............................................. C22B 59/00
[52] U.S. Cl. ......................................... 75/581; 75/610
[58] Field of Search ................................. 75/610, 581

[56] References Cited

U.S. PATENT DOCUMENTS

| | | | |
|---|---|---|---|
| 2,950,962 | 8/1960 | Carlson et al. | 75/84.4 |
| 3,150,964 | 9/1964 | Carlson et al. | 75/84 |
| 4,308,474 | 12/1981 | Savage et al. | 310/26 |
| 4,578,242 | 3/1986 | Sharma | 75/610 |
| 4,612,047 | 9/1986 | Schmidt et al. | 420/83 |
| 4,636,353 | 1/1987 | Seon et al. | 420/416 |

OTHER PUBLICATIONS

Beaudry & Gschneidner, Jr., Preparation And Basic Properties Of The Rare Earth Metals, 1978.

Primary Examiner—Peter D. Rosenberg
Attorney, Agent, or Firm—Tilton, Fallon, Lungmus & Chestnut

[57] ABSTRACT

Rare earth-transition metal (e.g., iron) scrap (e.g., Nd-Fe-B scrap) is flux (slag) remelted to reduce tramp nonmetallic impurities, such as oxygen and nitrogen, and metallic impurities, such as Li, Na, Al, etc., picked up by the scrap from previous fabrication operations. The tramp impurities are reduced to concentrations acceptable for reuse of the treated alloy in the manufacture of end-use articles, such as permanent magnets. The scrap is electroslag or inductoslag melted using a prefused, rare earth fluoride-bearing flux of $CaF_2$, $CaCl_2$ or mixtures thereof or the slag resulting from practice of the thermite reduction process to make a rare earth-iron alloy.

30 Claims, 2 Drawing Sheets

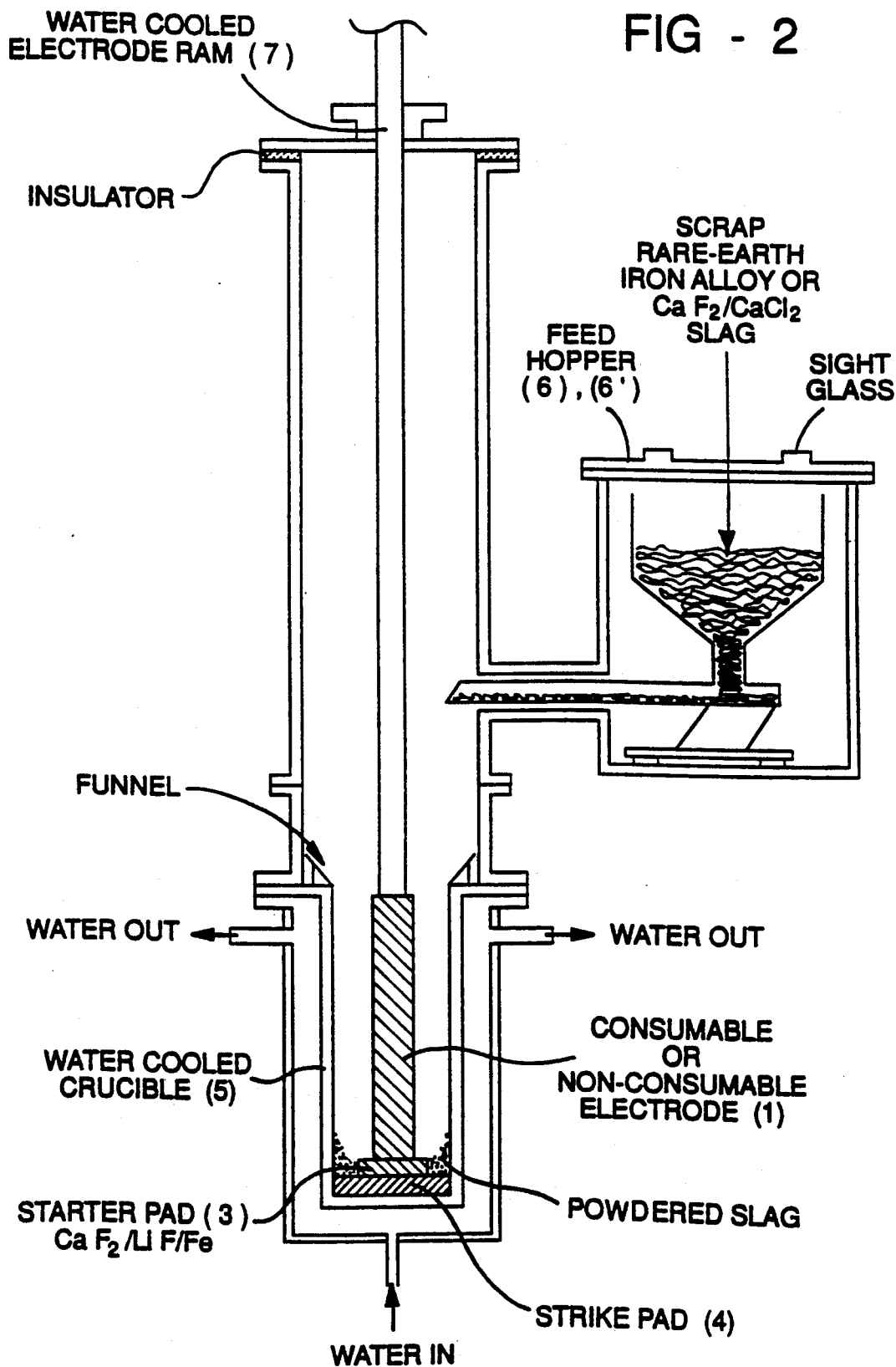

1

METHOD FOR TREATING RARE EARTH-TRANSITION METAL SCRAP

CONTRACTUAL ORIGIN OF THE INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to the treatment of rare earth/transition metal (e.g., iron) scrap by a flux (slag) melting method to reduce tramp impurities to levels acceptable for reuse of the alloy in the manufacture of end-use articles, such as permanent magnets.

BACKGROUND OF THE INVENTION

A number of rare earth-iron alloys have been developed which exhibit desirable magnetostrictive properties as described, for example, by Savage et al. in U.S. Pat. No. 4,308,475 which issued Dec. 29, 1981. The alloys described therein (e.g., Tb-Dy-Fe alloys) have been found to be useful in magnetostrictive transducers, delay lines, variable frequency resonators and filters.

Another group of alloys based on rare earth-iron-boron compositions is described in U.S. Pat. No. 4,612,047 issued Sep. 16, 1986 and by Seon et al. in U.S. Pat. No. 4,636,353 issued Jan. 13, 1987. The alloys (e.g., Nd-Fe-B) exhibit highly desirable magnetic properties for use as permanent magnets.

The commercialization of these rare earth/iron alloys has progressed to the point that relatively large quantities of rare earth/iron alloy scrap have been generated from the various manufacturing operations used to fabricate the alloys into suitable magnet components, electrical components and the like. The rare earth/iron alloy scrap generated by these fabrication operations varies considerably in form from dry, bulky, relatively large scrap pieces to a fine powder or dust referred to as "swarf". The bulky scrap pieces are produced primarily from casting and fabricating operations, while the swarf is produced primarily from abrasive cutting and grinding operations.

Industries that fabricate rare earth/iron alloys into articles of manufacture require some method to dispose of the rare earth/iron scrap and recover the alloy for reuse. This is especially true in the case of the rare earth/iron swarf generated in the various fabrication operations.

There is a need to dispose of the rare earth/iron alloy scrap in a manner that allows recovery of the alloy in a condition of purity amenable for reuse in the manufacture of end-use articles (e.g., permanent magnets) without the need for further alloy purification. In particular, a treatment process is needed that allows recovery of the rare earth/iron alloy in a manner effective to remove tramp non-metallic impurities, such as oxygen, nitrogen, hydrogen and metallic impurities, such as Li, Na, Al, Si, Ca, Zn, Mg, etc., picked up by the alloy during the various fabrication operations. The tramp elements must be reduced to levels specified by manufacturers of end-use articles, such as permanent magnets.

An object of the present invention is to address these needs by providing a flux (slag) remelting method applicable to rare earth/transition metal (e.g., iron) scrap for recovering the alloy at a purity level acceptable for reuse in the manufacture of end-use articles.

SUMMARY OF THE INVENTION

The present invention contemplates a method of treating rare earth-transition metal scrap contaminated with one or more tramp impurities, especially oxygen and nitrogen, picked up by the scrap from previous fabrication operations employed to make end-use articles. The method of the present invention involves the flux (slag) remelting of the rare earth-transition metal scrap in a manner to substantially reduce the concentration of the tramp impurities, especially oxygen and nitrogen, to levels acceptable for reuse in the manufacture of end-use articles.

In particular, the method of the invention involves melting a flux comprising an alkali or alkaline earth halide, preferably at least one of $CaF_2$, $CaCl_2$ and mixtures thereof, and the rare earth-transition metal scrap such that the melted scrap and the melted flux are in contact and react to substantially reduce the concentration of the tramp element(s) to acceptable levels for the end-use articles. A rare earth fluoride is preferably present in the flux to enhance removal of tramp oxygen from the scrap. In particular, a prefused $CaF_2$ and/or $CaCl_2$ slag produced as an end-product of preparation of a rare earth-transition metal alloy by thermite reduction preferably is employed as a flux in practicing the invention. The flux and the purified rare earth-transition metal alloy melt are then separated to permit reuse of the alloy in the manufacture of end-use articles.

In preferred embodiments of the invention, the flux and the rare earth-transition metal scrap may be melted by electroslag melting or induction skull inductoslag) melting.

The method of the invention achieves a substantial reduction in the concentrations of tramp non-metallic impurities, especially oxygen and nitrogen, of the rare earth-transition metal scrap; for example, a reduction in the oxygen and nitrogen concentration levels by generally a factor of about 10 and 50 or more, respectively, has been achieved as will become apparent below. The reduced levels of the tramp impurities in the purified rare earth-transition metal alloy render it reusable in the manufacture of end-use articles, such as permanent magnets.

BRIEF DESCRIPTION OF THE DRAWINGS

FIG. 2 is a schematic, sectioned side view of a consumable/non-consumable electrode type electroslag melting apparatus in the starting configuration for practicing an embodiment of the method of the invention.

DETAILED DESCRIPTION OF THE INVENTION

Figure 1:
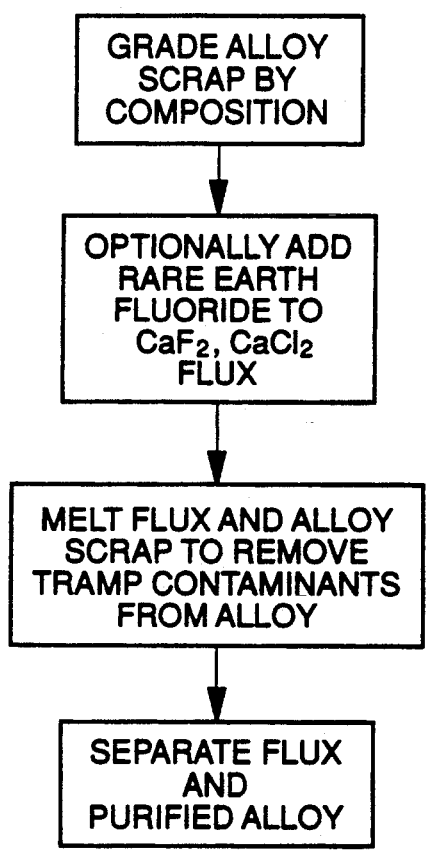
FIG. 1 is a flow sheet illustrating the sequential method steps of one embodiment of the invention.

Referring to FIG. 1, the various steps involved in practicing one embodiment of the method of the invention are illustrated. In this embodiment, rare earth-transition metal (e.g., iron) scrap is typically received from one or more fabricating operations, either on-site or off-site, and initially segregated (graded) by alloy composition, size, shape, and other factors. For example, fine, rare earth-transition metal alloy dust or powder (referred to as swarf) of like or similar composition is typically segregated for treatment whereas dry, bulky scrap pieces of the same or similar composition are typically segregated into one or more groups by size and shape for treatment.

Bulky scrap pieces typically are comprised of rare earth-transition metal alloy pieces from prior alloy preparation steps and scrap magnet material (rare-earth-transition metal alloys) generated during fabrication operations such as pressing, sintering, etc. Also included are fabricated rare earth-transition metal alloy magnets which have been rejected for use as a result of low magnetic strength as well as fabrication and other defects. Some rare earth metal in pariculate or other form may be present with the other scrap pieces depending upon the source of the scrap.

The method of the invention is capable of treating a wide variety of binary, ternary and other rare earth-transition metal alloy scrap compositions. In general, alloy scrap treatable in accordance with the invention will comprise (a) one or more transition metals such as Fe, Co and/or Ni, (b) one or more rare earth such as Nd, Dy, Tb, Pr, Sm, Ho, La, Ce, Eu, Gd, Er, Tm, Yb, Lu, Y, and/or Sc, (c) and other optional alloyants such as B or other non-metallic elements that may be used for one reason or another in the alloy compositions. As mentioned above, the scrap will typically be segregated for treatment into groups having the same or similar compositions. For example, Tb-Dy-Fe alloy scrap will be segregated and treated apart from Nd-Fe-B alloy scrap to preserve the alloy composition to the maximum extent possible.

The method of the invention involves purifying the rare earth-transition metal scrap by contacting the scrap in the molten state with a suitable alkali halide flux (NaCl, KCl, NaF, KF, etc.) or alkaline earth halide flux (e.g., $CaCl_2$, $MgCl_2$, $CaF_2$, etc.) in a suitable melting container (to be described below). Preferably, the flux is selected from at least one of $CaF_2$, $CaCl_2$ and mixtures thereof. Even more preferably, the flux used in practicing the invention comprises prefused $CaF_2$ flux, prefused $CaCl_2$ flux or $CaF_2$-rich slag that is produced as an end product from the preparation of rare earth-iron alloys by the thermite reduction process in accordance with U.S. Pat. No. 4,612,047, the teachings of which are incorporated herein by reference.

In particular, the thermite reduction process typically produces a prefused $CaF_2$ slag (used as a flux in practicing the invention) which contains residual amounts of Ca (a reducing agent) and a rare earth fluoride (e.g., $NdF_3$) The Ca content of the prefused slag produced by the thermite reduction process is about 5 to 10 weight %. The concentration of the rare earth fluoride (e.g., $NdF_3$) typically is about 2 to about 5 weight %. The Ca metal (reducing agent) is present in the slag (flux) in sufficient concentration to combine with the oxygen and nitrogen impurities present in the scrap. Also, the excess Ca may during electroslag melting or induction skull melting, reduce any unreacted rare earth fluoride or iron fluoride present in the slag from the thermite reduction process, thereby increasing the overall yield of the process. The rare earth fluoride is present in sufficient concentration to enhance control over the removal of tramp oxygen from the alloy scrap to be treated in accordance with the invention. In particular, the rare earth fluoride effects formation of stable rare earth oxyfluorides which are incorporated into the flux (slag).

In lieu of using the prefused, rare earth halide-bearing slag (flux) from the thermite reduction process, commercially available $CaF_2$ or $CaCl_2$ can be used. The $CaF_2$ purchased flux is prefused at 1450° C. for about 15 minutes and the $CaCl_2$ is prefused at 850° C. for about 15 minutes for use in practicing the present invention. The $CaF_2$ flux is available commercially from Mallinckrodt Inc., 675 McDonnell Blvd. St. Louis, Miss. 63134. The $CaCl_2$ flux is available from J. T. Baker Inc., 222 Red School Lane, Phillipsburg, N.J. 08865.

Referring to FIG. 1, the flux and the rare earth-transition metal (e.g., Fe) scrap are melted and contacted in a melting container to effect a typical slag/melt reaction between the molten flux (slag) and the molten alloy to remove tramp non-metallic impurities such as oxygen, nitrogen, and hydrogen and metallic impurities such as Li, Na, Al, Si, Ca, Zn, Mg, etc. from the molten alloy. These tramp impurities are picked up by the scrap during previous fabrication operations to make end-use articles (e.g., magnets). The tramp elements present in the scrap are harmful to the magnetic and properties of the alloys and must be removed to lower concentration levels before the alloy can be reused in the fabrication of such end-use articles, as will be explained below.

Figure 3:
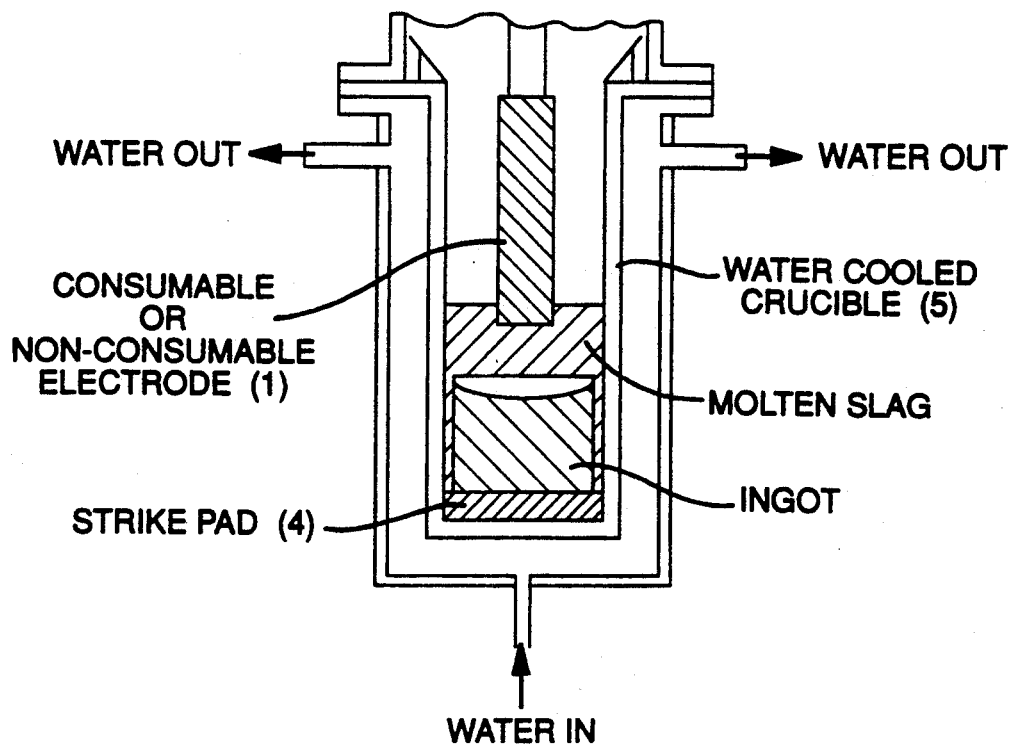
FIG. 3 is an enlarged, fragmentary view of the lower portion of the electroslag melting apparatus of FIG. 2, during the melting operation.

Melting of the flux and the scrap can be conducted by various melting techniques. Electroslag melting and induction skull (inductoslag) melting are preferred for practicing the invention. Referring to FIGS. 2 and 3, an electroslag melting apparatus is shown for use in practicing the method of the invention wherein the scrap is introduced to the melting container until an alloy ingot of the desired size is obtained.

In particular, in the electroslag melting process, a water cooled, copper container (crucible) 5 is initially partially filled with the flux (e.g., $CaF_2$ or a mixture of $CaF_2$ and $CaCl_2$). The flux overlies a starter pad 3 placed on top of a strike pad 4 on the bottom of the water cooled copper crucible 5. The starter pad 3 comprises a mass of iron (or other transition metal) turnings covered by a mass of $CaF_2$/LiF flux mixture wherein the LiF is present in an amount of about 25 weight % of the flux mixture. For convenience, the constituents of the starter pad are compacted into a disc shape. The starter pad 3 aids in establishment of an AC electrical current through the flux without arcing between the strike pad 4 and an electrode 1. Importantly, the starter pad 3 is selected so as to be non-contaminating to the rare earth-transition metal alloy to be purified in the melting container (crucible) 5.

The electrode 1 may be (a) consumable (e.g. a thin iron tube filled with the alloy scrap and compacted about the alloy scrap using a hydraulic press to consolidate the scrap therein) or (b) substantially non-consumable (e.g., Fe (cooled Fe electrode), Mo, Ta or graphite).

The electrode 1 is initially positioned in a raised position by a water cooled electrode ram 7 during filling of the container 5 with the flux. The electrode 1 is then lowered by the ram 7 to the position (shown in FIG. 1) contacting the starter pad 3. A suitable AC electrical voltage is then applied between the electrode 1 and the strike pad 4 to establish an AC electrical current through the flux to resistively heat and melt it ($CaF_2$ melting point about 1400° C.; $CaCl_2$ melting point about 775° C.). Additional flux (slag) may be added to the container (crucible) 5 during the melting operation.

If a non-consumable electrode 1 is used, the rare earth-iron alloy scrap is then added to the molten flux via a vibrating feed hopper 6 and is melted in the container 5 by contact with the molten flux. The molten flux and the molten alloy react in the mold in accordance with a typical slag/metal reaction to remove the aforementioned tramp non-metallic and metallic impurities (e.g., oxygen, nitrogen, hydrogen, Li, Na, Al, Si, Ca, Zn, Mg, etc.) from the alloy to the flux (slag). The purified alloy progressively solidifies and builds up on the water cooled mold as shown in FIG. 3. The water cooled container (crucible) 5 can be equipped with a withdrawal mechanism so that the solidified alloy ingot can be withdrawn at a uniform rate from the bottom of the container (crucible) 5 to yield an ingot of gradually increasing length. Such a bottom withdrawal technique is described by T. H. Malim in Iron Age, 200, p. 52 (Aug. 3, 1967). As the solidified alloy ingot is withdrawn, additional alloy scrap is continuously added to the flux by the vibrating feed hopper 6 to maintain a more or less continuous melting/ purification/ solidification process to form an elongated ingot of the purified rare earth-iron alloy.

If a consumable electrode 1 is used (i.e., the iron tube compacted about the scrap), the scrap is introduced into the molten flux by melting of the electrode itself and a vibrating feed hopper 6' is used to introduce additional flux as the melting process progresses. The melted alloy scrap contacts and reacts with the molten flux and progressively solidifies on the bottom of the container (crucible) 5 as a purified ingot.

The invention also envisions using induction skull melting (inductoslag melting) to melt the flux and the rare earth-iron scrap for purification purposes. In particular, a $CaF_2$, $CaCl_2$ flux or the aforementioned slag from the thermite reduction process (used as a flux) is added to a segmented, water cooled copper container (crucible) of the type described by D. S. Reed in *Industrial Heating*, 57, no. 1, p. 20 (Jan., 1990) and shown in U.S. Pat. No. 4,738,713, the teachings of which are incorporated herein by reference. A small billet of the rare earth-iron alloy is placed on the flux followed by the addition of further flux atop and covering the billet. An induction coil disposed about the crucible is then energized sufficiently to inductively heat and melt the billet and thus the flux. The crucible is segmented (slotted about its periphery) to minimize attenuation of the field of the induction coil.

A thin layer of the melted flux rapidly solidifies on the surface of the water cooled crucible to form a skull that separates the crucible and the molten alloy from one another. The rare earth-iron alloy scrap is then introduced to the crucible where it is melted, contacts the molten flux and settles toward the bottom of the crucible. The molten alloy is purified (i.e., tramp oxygen, nitrogen, hydrogen and metallic impurities are removed) by virtue of contact of the molten flux with the molten alloy in the manner described above for electroslag melting. The purified alloy solidifies and builds up in the water cooled crucible.

Both the electroslag and the induction skull melting processes described above can be conducted under a protective partial pressure of high grade (high purity) argon or other inert gas.

The present invention, is not limited to continuous electroslag or induction skull melting/purification/solidification processes as described above and can be practiced using batch melting/purification/solidification processes of various types as well.

In general, the method of the invention is useful in treating rare earth-transition metal scrap having oxygen, nitrogen, hydrogen and other non-metallic and/or metallic tramp impurity elements at concentration levels unacceptable for use in the manufacture of end-use articles, such as permanent magnets and magnetostrictive devices, such as transducers. In particular, the method of the invention is advantageous in treating rare earth-transition metal scrap alloy having tramp elements in the range of about 0.5 to 0.75 weight % for oxygen, about 0.05 to 0.20 weight % for nitrogen and about 0.006 to 0.02 weight % for hydrogen, although the invention is not limited to these tramp elements or these levels of tramp elements. The method of the invention has proved useful in reducing the concentration levels of these tramp elements to acceptable levels of about 0.025 weight % or below (preferably about 0.015 weight % or below) for oxygen, about 0.0035 weight % or below (preferably about 0.0025 weight % or below) for nitrogen, and about 0.001 weight % or below for hydrogen. The reduced levels of tramp impurities achievable by the present invention compare favorably to the levels specified by manufacturers of the end-use articles for these tramp elements, as will become apparent below.

Among other impurities that are routinely removed by the process of the invention are metallic impurities such as Li, Na, Al, Si, Ca, Zn, Mg, etc.

The following Examples are offered to illustrate the invention in detail without limiting the scope thereof.

EXAMPLE 1

Nd-Fe-B permanent magnet alloy scrap was received from a manufacturer of permanent magnets and treated in accordance with the invention to reduce the tramp impurities present. The Nd-Fe-B alloy scrap comprised about 32 weight % Nd, about 67 weight % Fe and about 1 weight % B and included tramp oxygen, nitrogen, and hydrogen levels set forth in Table I below. These levels of tramp impurities rendered the alloy scrap unacceptable for reuse in the manufacture of permanent magnets.

A quantity (e.g., 21 grams) of prefused $CaF_2$ flux was introduced to a Ta crucible. A quantity (e.g., 39 grams) of the Nd-Fe-B alloy scrap in solid form was then introduced into the crucible. The contents of the crucible were heated to about 1450° C. in an induction furnace for a few (e.g., 5) minutes under an Ar atmosphere and then allowed to cool in the crucible until solid. Chemical analyses of the scrap alloy before the treatment and of the purified alloy after the treatment are shown in Table I below.

TABLE I

| Chemical Analysis of Nd—Fe—B Scrap and Purified Alloy (Concentration in ppm by weight) | | | | |
|---|---|---|---|---|
| | O | N | H | C |
| Scrap Before | 2400 | 1850 | 48 | 380 |
| Casting After | 250 | 32 | 30 | 454 |

It is apparent that the oxygen and nitrogen concentration levels were substantially reduced by the flux (slag) melting treatment. In particular, the oxygen content was reduced by a factor of nearly 10 while the nitrogen content was reduced by a factor of nearly 60. These reduced levels compare favorably to the corresponding levels specified by the permanent magnet manufacturer for an acceptable Nd-Fe-B alloy; namely, about 0.10 to 0.15 weight % for oxygen and about 0.03 to 0.06 weight % for nitrogen. The hydrogen level was reduced from 48 ppm to 30 ppm. The reduced hydrogen level (30 ppm) is quite acceptable to the magnet manufacturer. Although the carbon concentration of the alloy increased as a result of the flux (slag) melting treatment, the carbon content was still within the manufacturer's specification for carbon; namely, about 0.05 weight %.

EXAMPLE 2

Another portion of Nd-Fe-B permanent magnet alloy scrap from a manufacture of permanent magnets similar to that used in Example 1 was heated with $CaCl_2$ in an effort to substantially decrease the concentration of the tramp elements such as oxygen and nitrogen.

For example, a quantity (e.g., 20 grams) of prefused $CaCl_2$ flux was introduced to a Ta crucible. A quantity (e.g., 40 grams) of the Nd-Fe-B alloy scrap in solid form was then introduced into the crucible. The contents of the crucible were heated to about 1350° C. in an induction furnace for a few (e.g., 5) minutes under an Ar atmosphere and then allowed to cool in the crucible until solid. Chemical analyses of the scrap alloy before treatment and of the purified alloy after the treatment are shown in Table II below.

TABLE II

| Chemical Analysis of Nd—Fe—B Scrap and Purified Alloy (Concentration in ppm by weight) | | | | |
|---|---|---|---|---|
| | O | N | H | C |
| Scrap Before | 2400 | 1850 | 48 | 380 |
| Casting After | 190 | 14 | 100 | 310 |

EXAMPLE 3

Several kilograms of Nd-Fe-B permanent alloy scrap from a manufacturer of permanent magnets similar to that used in Example 1 was non-consumably electroslag melted using the apparatus shown in FIG. 2. A 5.7 cm diameter molybdenum non-consumable electrode measuring about 25 cm in length was attached to the water-cooled electrode ram. A $CaF_2$-25%LiF-Fe starter pad was placed on top of a 2 cm thick Nd-Fe-B strike pad in the bottom of a 10 cm diameter copper crucible, and the electrode assembly was lowered until contact was made. Prefused $CaF_2$ flux (slag) was then added to the crucible, the electroslag system evacuated, and back-filled with argon gas to a pressure of 38 cm. The electrode was then energized with about 1200 amps and 10 volts of AC power. Under these conditions, the starter pad and the $CaF_2$ slag became molten and sufficient slag from the feed hopper was added to produce a 5 cm thick slag layer. The power to the electrode was then increased to 2000 amps and 15 volts and pieces of the scrap magnet alloy were gradually added to the melt. Sufficient time was allowed during scrap additions for the pieces to become molten, pass through the molten slag, and collect in ingot form at the bottom of the crucible. The melt was maintained until 4801 grams of scrap were melted. The electroslag system was cooled to room temperature, and the refined ingot removed from the crucible and analyzed. Analysis of the Nd-Fe-B scrap before and after non-consumable electroslag melting is shown in Table III.

TABLE III

| Chemical Analysis of Nd—Fe—B Scrap and Purified Alloy (Concentration in ppm by weight) | | | | |
|---|---|---|---|---|
| | O | N | H | C |
| Scrap Before | 2400 | 1850 | 48 | 380 |
| After Non-Consumable Electroslag Melting | 93 | 16 | 21 | 397 |

EXAMPLE 4

Approximately three and a half kilograms of Nd-Fe-B permanent magnet scrap from a manufacturer of permanent magnets similar to that of Example 1 were compacted into an electrode for consumable electroslag melting. A steel compacting die was used to form the electrode which measured 3.8 cm × 3.8 cm × 46 cm. A 0.5 mm thick sheet of iron shim stock was used to line the compacting die into which the crushed pieces of the magnet scrap was evenly distributed. Two strips of shim stock, measuring 1 cm wide and 46 cm length, were also placed in the die cavity along with the scrap pieces to serve as a continuous internal current carrier and to increase the strength of the compacted electrode. The electrode was attached to the electrode ram as shown in FIG. 2. The $CaF_2$-25%LiF-Fe starter pad and the Nd-Fe-B strike pad were placed in the bottom of the crucible. Approximately two kilograms of prefused high purity $CaF_2$ slag was added to the feed hopper. The system was evacuated and back filled with argon to a pressure 38 cm. Contact was made between the electrode and the starter pad, and the electrode energized with 1500 amps and 15 volts AC power. Approximately one kilogram of prefused $CaF_2$ was added and the power increased to 2000 amps and 16 volts. When the slag was molten, the consumable melting of the electrode was initiated and after about 14 minutes was complete. Some $CaF_2$ was added during the melt to compensate for the thin layer of $CaF_2$ that freezes next to the cold crucible wall during the melting process. After cooling to room temperature, the well-formed ingot was removed from the crucible and sampled for analysis. The result of these analyses is shown in Table IV.

TABLE IV

| Chemical Analysis of Nd—Fe—B Scrap and Purified Alloy (Concentration in ppm by weight) | | | | |
|---|---|---|---|---|
| | O | N | H | C |
| Scrap Before | 7600 | 200 | 61 | 625 |
| After Consumable Electroslag Melting | 140 | 25 | 2 | 750 |

EXAMPLE 5

Approximately three kilograms of Nd-Fe-B permanent magnet alloy scrap from a manufacturer of permanent magnets were prepared into an electrode as described in Example 4. The scrap contained inside the outer wrap of iron shim stock was consumably electroslag melted as in Example 4 except the $CaF_2$ slag was provided from the thermite reduction process in which $NdF_3/FeF_3$ are co-reduced with calcium metal. Melting of the electrode was effected using 1900 amps and 13 volts of AC power. The electrode was melted in about 9 minutes. After cooling to room temperature, the ingot was sampled for chemical analysis. The results of these analyses are shown in Table V.

TABLE V

Chemical Analysis of Nd—Fe—B Scrap and Purified Alloy
(Concentration in ppm by weight)

|  | O | N | H | C |
|---|---|---|---|---|
| Scrap Before | 4950 | 500 | 190 | 380 |
| After Consumable Electroslag Melting | 120 | 17 | 45 | 425 |

EXAMPLE 6

Approximately five kilograms of Nd-Fe-B permanent magnet alloy scrap from a manufacturer of permanent magnets similar to that of Example 1 were first induction melted without flux (slag) in an $Al_2O_3$ crucible and bottom pour cast into a 10 cm diameter by 30 cm long water-cooled copper mold. An iron plug was placed in the mold so as to become welded to the poured ingot and serve as an electrode adapter during subsequent electroslag melting. Because of the brittle nature of the cast Nd-Fe-B alloy, two iron reinforcing rods measuring 0.5 cm in diameter by 30 cm in length were also placed in the mold prior to casting. The solidified, bottom-pour ingot was then used as an electrode in subsequent electroslag melting.

The electrode (ingot) was attached to the water cooled electrode ram via the electrode adapter, and the strike pad and starter pad placed in the bottom of the copper crucible. Approximately two kilograms of $CaF_2$ slag from the thermite reduction of $NdF_3/FeF_3$ with calcium metal was crushed and placed in the feed hopper. The electroslag melting furnace was evacuated and back-filled with argon to a pressure of 38 cm. The electrode casting was energized with 1500 amps and 15 volts. After the starter pad and surrounding $CaF_2$ (thermite slag) were molten, an additional one kilogram of slag was added from the hopper and the AC power increased to 2000 amps and 11-12 volts. The casting was consumable electroslag melted in about 10 minutes. The electroslag system was cooled to room temperature and the 6289 gram ingot removed and sampled for analysis. The results are shown in Table VI.

TABLE VI

Chemical Analyses of Nd—Fe—B Scrap and Purified Alloy
(Concentration in ppm by weight)

|  | O | N | H | C |
|---|---|---|---|---|
| Scrap Before | 4950 | 500 | 190 | 380 |
| After Consumable Electroslag Melting | 102 | 18 | 30 | 412 |

While the invention has been described in terms of specific embodiments thereof, it is not intended to be limited thereto but rather only to the extent set forth hereafter in the following claims.

We claim:

1. A method of treating rare earth-transition metal scrap contaminated with a non-metallic or metallic impurity for reuse in the manufacture of end-use articles, comprising the steps of:
   a) contacting a melt of the scrap and a molten alkali or alkaline earth halide flux to remove the impurity from the melt to the flux without reduction of the flux such that the concentration of the impurity is reduced in the melt, and
   b) separating the flux and the melt for reuse in the manufacture of end-use articles.

2. The method of claim 1 wherein said flux comprises:
   a) at least one of $CaF_2$, $CaCl_2$ and mixtures thereof, and
   b) a rare earth halide.

3. The method of claim 2 wherein said flux comprises a prefused, rare earth halide-bearing flux produced as an end-product from preparation of a rare earth-transition metal alloy by thermite reduction.

4. The method of claims 2 or 3 wherein a rare earth fluoride is present in the flux.

5. The method of claim 1 wherein the flux and the rare earth-transition metal scrap are electroslag melted.

6. The method of claim 5 wherein the flux and the rare earth-transition metal scrap are electroslag melted by placing said flux in a container, establishing an AC electrical arc between the container and an electrode disposed in the flux so as to melt the flux, and melting said scrap so as to contact the melted flux.

7. The method of claim 6 wherein the electrode is a consumable electrode comprising the rare earth-transition metal scrap.

8. The method of claim 6 wherein the electrode is a non-consumable electrode selected from Fe, Ta, Mo or graphite.

9. The method of claim 1 wherein the flux and the rare earth-transition metal scrap are induction skull melted.

10. The method of claim 9 wherein the flux and the scrap are induction skull melted in a segmented, cooled container such that a skull of solidified flux is present between the container and the melted scrap.

11. The method of claims 6 or 10 wherein the rare earth-transition metal alloy is recovered by progressively solidifying lowermost portions of said alloy in the container and progressively withdrawing said solidified portions through a bottom of said container.

12. A method of treating rare earth-iron alloy scrap contaminated with oxygen and nitrogen impurities for reuse in the manufacture of end-use articles, comprising the steps of:
   a) contacting a melt of the scrap and a molten alkali or alkaline earth halide flux to remove the impurities from the melt to the flux without reduction of the flux such that the concentrations of the impurities are reduced in the melt, and
   b) separating the flux and the melt for reuse in the manufacture of end-use articles.

13. The method of claim 12 wherein the scrap comprises rare earth-iron-boron alloy scrap.

14. The method of claims 12 or 13 including in step a, reducing the concentration of the oxygen and nitrogen in the melt to at least about 0.025 weight % and about 0.0035 weight %, respectively.

15. The method of claim 14 wherein the oxygen concentration and the nitrogen concentration are reduced from initial levels in the scrap of about 0.5 to 0.75 weight % and about 0.05 to 0.20 weight %, respectively.

16. The method of claim 12 wherein said flux comprises:
   a) at least one of $CaF_2$, $CaCl_2$ and mixtures thereof, and
   b) a rare earth halide.

17. The method of claim 16 wherein said flux comprises a prefused, rare earth halide-bearing flux produced as an end-product from preparation of a rare earth-transition metal alloy by thermite reduction.

18. The method of claims 16 or 17 wherein a rare earth fluoride is present in the flux.

19. The method of claim 12 wherein the flux and the rare earth-iron scrap are electroslag melted.

20. The method of claim 19 wherein the flux and the rare earth-iron scrap are electroslag melted by placing said flux in a container, establishing an AC electrical arc between the container and electrode disposed in the flux so as to melt the flux, and melting said scrap so as to contact the melted flux.

21. The method of claim 20 wherein the electrode is a consumable electrode comprising the rare earth-iron scrap.

22. The method of claim 20 wherein the electrode is a non-consumable electrode selected from Fe, Ta, Mo or graphite.

23. The method of claim 12 wherein the flux and the rare earth-iron scrap are induction skull melted.

24. The method of claim 23 wherein the flux and the rare earth-iron scrap are induction skull melted in a segmented, cooled container such that a skull of solidified flux is present between the container and the melted scrap.

25. The method of claims 20 or 24 wherein the rare earth-iron alloy is recovered by progressively solidifying lowermost portions of said alloy in the container and progressively withdrawing said solidified portions through a bottom of said container.

26. A method of treating rare earth-transition metal scrap contaminated with oxygen and nitrogen impurities for reuse in the manufacture of end-use articles, comprising the steps of:

a) contacting a melt of the scrap and a molten alkali or alkaline earth halide flux to remove the impurities from the melt to the flux without reduction of the flux such that the concentrations of the oxygen and nitrogen are reduced in the melt, and b) separating the flux and the melt for reuse in the manufacture of end-use articles.

27. The method of claim 26 wherein the step (a), the oxygen concentration in the melt is reduced to about 0.025 weight % or less and the nitrogen concentration is reduced to about 0.0035 weight % or less.

28. The method of claim 27 wherein the oxygen concentration and the nitrogen concentration are reduced from initial levels in the scrap of about 0.5 to 0.75 weight % and about 0.05 to 0.20 weight %, respectively.

29. The method of claim 26 wherein said flux comprises:

a) at least one of $CaF_2$, $CaCl_2$ and mixtures thereof, and b) a rare earth halide.

30. The method of claim 29 wherein said flux comprises a prefused, rare earth halide-bearing flux produced as an end-product from preparation of a rare earth-transition metal alloy by thermite reduction.

* * * * *